(12) United States Patent
Recker et al.

(10) Patent No.: US 8,219,283 B2
(45) Date of Patent: Jul. 10, 2012

(54) ACTIVE STEERING NIBBLE CONTROL ALGORITHM FOR ELECTRIC STEERING SYSTEMS

(75) Inventors: Darrel Recker, Ypsilanti, MI (US); Joseph Mikhael Raad, Farmington, MI (US)

(73) Assignee: Ford Global Technologies, Dearborn, MI (US)

( * ) Notice: Subject to any disclaimer, the term of this patent is extended or adjusted under 35 U.S.C. 154(b) by 944 days.

(21) Appl. No.: 12/188,485

(22) Filed: Aug. 8, 2008

(65) Prior Publication Data

US 2009/0125186 A1    May 14, 2009

Related U.S. Application Data

(60) Provisional application No. 60/987,806, filed on Nov. 14, 2007.

(51) Int. Cl.
*A01B 69/00* (2006.01)
(52) U.S. Cl. .......................... 701/41; 701/42
(58) Field of Classification Search .............. 701/41–44
See application file for complete search history.

(56) References Cited

U.S. PATENT DOCUMENTS

| | | | |
|---|---|---|---|
| 3,888,328 A | 6/1975 | Leiber | |
| 5,919,241 A | 7/1999 | Bolourchi et al. | |
| 6,122,579 A * | 9/2000 | Collier-Hallman et al. | .... 701/41 |
| 6,131,693 A | 10/2000 | Mukai et al. | |
| 6,134,490 A | 10/2000 | Ito et al. | |
| 6,161,068 A | 12/2000 | Kurishige et al. | |
| 6,240,350 B1 * | 5/2001 | Endo | ................. 701/41 |
| 6,360,151 B1 * | 3/2002 | Suzuki et al. | .............. 701/41 |
| 6,370,459 B1 * | 4/2002 | Phillips | ........................ 701/41 |
| 6,681,883 B2 | 1/2004 | Loh et al. | |
| 6,742,620 B2 | 6/2004 | Eidam et al. | |
| 6,752,425 B2 | 6/2004 | Loh et al. | |
| 6,999,862 B2 * | 2/2006 | Tamaizumi et al. | .......... 701/41 |
| 7,079,929 B2 * | 7/2006 | Sawada et al. | .............. 701/41 |
| 7,100,735 B2 | 9/2006 | Burton et al. | |
| 7,226,082 B2 * | 6/2007 | Muramatsu et al. | ........ 280/775 |
| 7,272,645 B2 * | 9/2007 | Chang et al. | ............... 709/223 |
| 7,921,196 B2 * | 4/2011 | Harrang et al. | ............ 709/223 |
| 2006/0278030 A1 | 12/2006 | Tavel et al. | |
| 2007/0205041 A1 | 9/2007 | Nishizaki et al. | |

FOREIGN PATENT DOCUMENTS

| | | |
|---|---|---|
| JP | 10315992 | 5/1997 |
| JP | 2005320003 A | 11/2005 |

* cited by examiner

*Primary Examiner* — Hussein Elchanti
(74) *Attorney, Agent, or Firm* — Angela M. Brunetti; Fredrick Owens

(57) ABSTRACT

A system and method for actively cancelling steering nibble and/or brake judder in an electric power steering system using a controller and an electric motor by converting a selected wheel speed to a frequency, selecting a nibble order, determine nibble enable frequencies for cancellation, selecting a damping factor based on changes in vehicle velocity, calculating filter coefficients based on the selected damping factor, the selected nibble order and the wheel frequency, applying a gain scheduler to a steering column torque signal for the nibble enable frequencies, applying a tuned resonator filter to an output of the gain scheduler and using the filter coefficients to produce a nibble signal, calculating an active nibble cancelling torque signal from the nibble signal and applying the active nibble cancelling torque signal to the electric motor to cancel steering wheel nibble vibration.

14 Claims, 4 Drawing Sheets

# ACTIVE STEERING NIBBLE CONTROL ALGORITHM FOR ELECTRIC STEERING SYSTEMS

CROSS REFERENCE

This application claims the benefit of the filing date of U.S. Provisional Application Ser. No. 60/987,806, filed Nov. 14, 2007, entitled "Active Steering Nibble Control Algorithm for Electric Steering System" the entire disclosures of which are hereby incorporated by reference into the present disclosure."

TECHNICAL FIELD

The invention relates to motor vehicle electric steering systems and more particularly to an algorithm for actively controlling steering nibble in an electric steering system.

BACKGROUND

Steering nibble is the undesirable rotational vibration experienced by the driver at the steering wheel mainly during straight line driving. In some vehicles steering wheel nibble is the result of the chassis system responding to the tire and wheel force variations which eventually feed back in the form of slight rotations in the steering system. In many vehicles, steering nibble is caused by the presence of a front road wheel imbalance or front tire force variation. This steering wheel vibration occurs at a frequency of one times (1×) the rotational velocities of the front road wheels. The vibrations magnitude is maximized when these frequencies align with the steering/suspension resonant frequency, typically 12 to 20 Hz.

Brake judder is due to a chain of events, at the beginning of which there is unequal wear of the brake disks which leads to thickness variation of the brake disk. This disk thickness variation produces a harmonic modulation of the braking force during braking. The oscillations of the braking force in turn excite different modes of the wheel suspension, the vibrations being transmitted via a kinematic coupling to the steering system and in particular to the steering rod, if they lie in a specific critical frequency range, are in turn transmitted to the steering wheel and excite an oscillation of the steering gear, of the steering column and the steering wheel. For brake judder the vibration occurs at a frequency of one times (1×) or two times (2×) the rotational velocities of the front road wheels.

Steering wheel nibble and brake judder are customer concerns in many production automobiles. Original equipment manufacturers and their suppliers are investigating chassis modifications to address and reduce nibble and judder. However, these modifications often have negative effects on other vehicle characteristics, and are typically expensive to implement.

There is a need to detect and actively control steering nibble and brake judder in an electric steering system without affecting steering feel, with the aim of reducing steering nibble related warranty costs.

SUMMARY

The inventive subject matter is a system and method for actively cancelling steering nibble and/or brake judder in an electric power steering system using a controller and an electric motor by converting a selected wheel speed to a frequency, selecting a nibble order, determine nibble enable frequencies for cancellation, selecting a damping factor based on changes in vehicle velocity, calculating filter coefficients based on the selected nibble order and the wheel frequency, applying a gain scheduler to a steering column torque signal for the nibble enable frequencies, applying a tuned resonator filter to an output of the gain scheduler and using the filter coefficients to produce a nibble signal, calculating an active nibble cancelling torque signal from the nibble signal and applying the active nibble cancelling torque signal to the electric motor to cancel steering wheel nibble vibration.

DESCRIPTION OF DRAWINGS

A more complete understanding of the present invention may be derived by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present invention.

DESCRIPTION OF INVENTION

While various aspects of the present invention are described with reference to a particular illustrative embodiment, the invention is not limited to such embodiments, and additional modifications, applications, and embodiments may be implemented without departing from the present invention.

Figure 1:
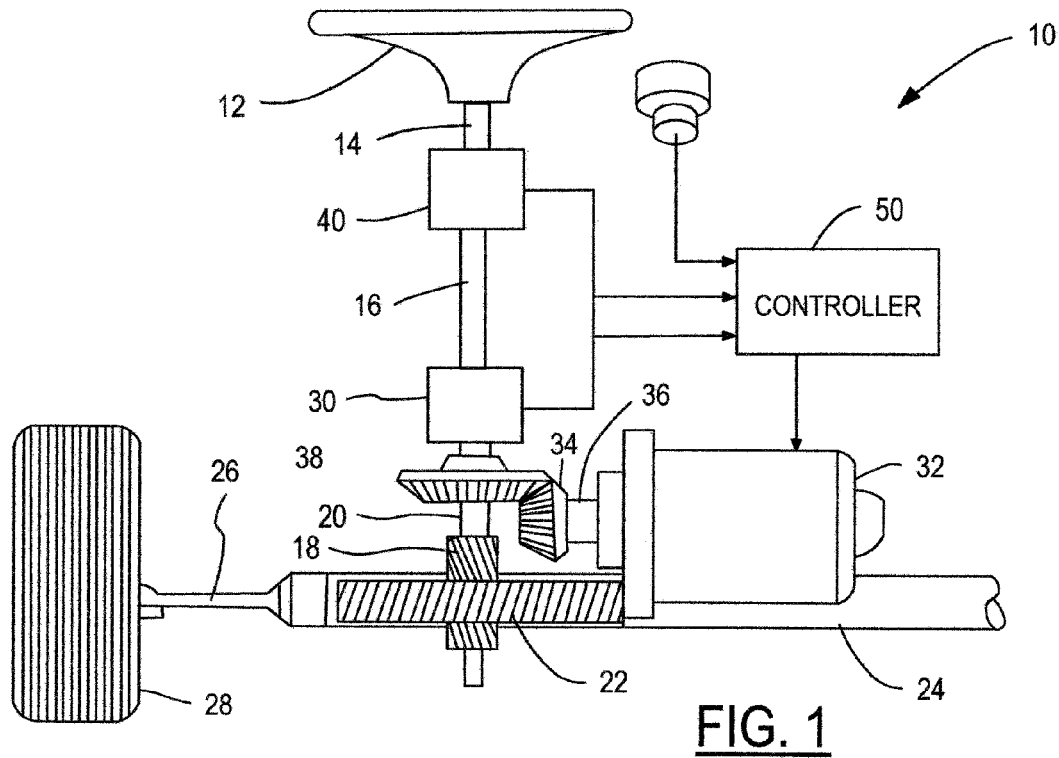
FIG. 1 is an electrical power steering system.

Referring to FIG. 1, an electrically assisted power steering system 10 includes a steering wheel 12 attached to a first end 14 of a steering shaft 16. A steering pinion gear 18, attached to a second end 20 of the steering shaft 16 opposite the first end 14, engages a steering rack gear 22 of a steering rack 24. Each end of the steering rack 24 includes a tie rod 26 attached to a steerable wheel and tire assembly 28 in a conventional manner. A steering torque sensor 30 is incorporated in the steering shaft 16 for detecting a steering torque applied by an operator to the steering shaft 16 by way of the steering wheel 12. A steering wheel angle sensor 40 senses a steering wheel angle. An electric motor 32 includes an output gear 34 mounted on an output shaft 36 for drivingly engaging an assist input gear 38 mounted on the steering shaft 16. Alternatively shown in FIG. 2, the electric motor 32' may have its output shaft 36' and an output gear 34' arranged to directly engage the steering rack 24'. A controller 50 receives signals representative of the torque of the steering shaft 16 between sensors 30 and 40.

Figure 2:
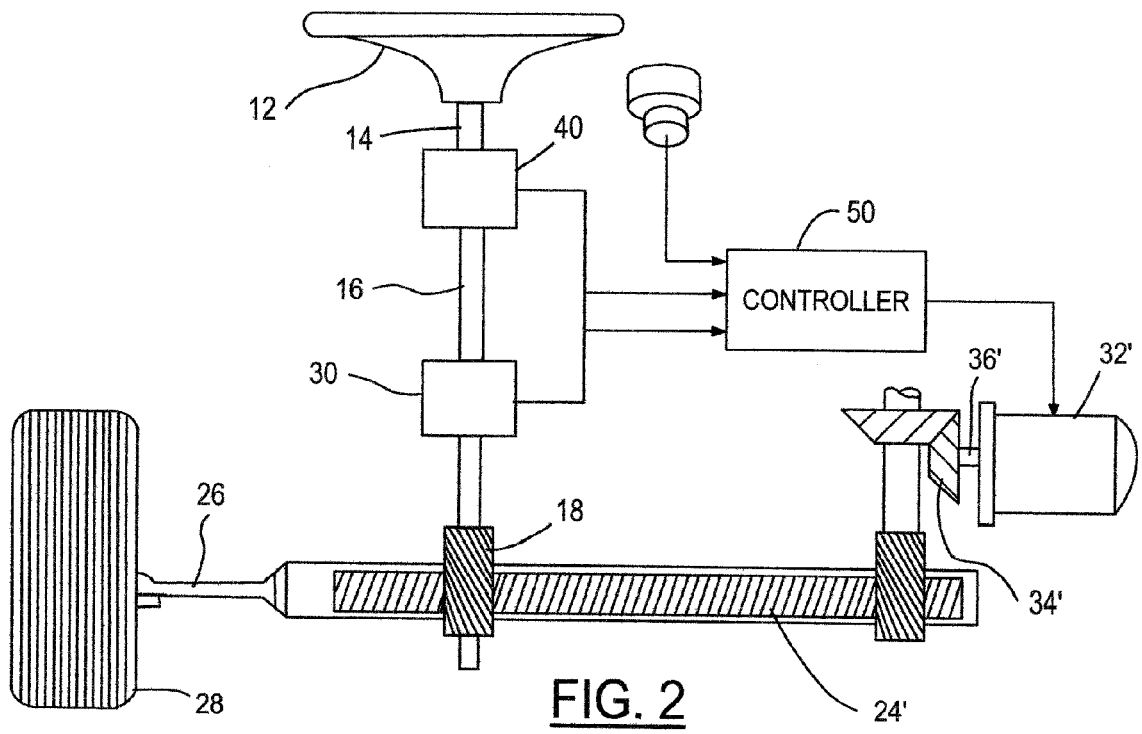
FIG. 2 is an electrical power steering system.

In either FIG. 1 or 2, the electric motor may be a DC brush or brushless motor. It may utilize a three-phase alternating current induction motor. It should be noted that a variable reluctance motor may be substituted for the inductance motor without impacting the performance of the inventive subject matter. Induction and variable reluctance motors are typically used in electrically assisted power steering systems because of their low friction and high torque-to-inertia ratio compared to larger electric motors.

Figure 3:
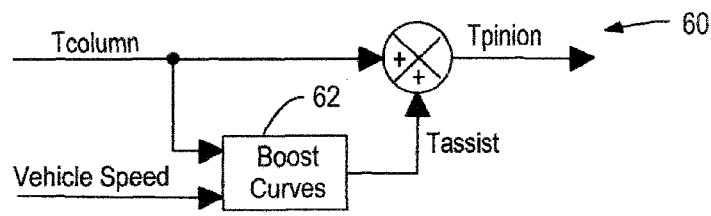
FIG. 3 is a block diagram of torques represented in a typical electric power steering system.

FIG. 3 is a block diagram of a typical electric power steering system 60. In a typical electric power steering system 60, vehicle speed, $V_s$, and steering column torque, $T_{column}$, signals are used, along with boost curves a 62 to determine the amount of assist torque, $T_{assist}$ required to aid the driver in steering the vehicle. The assist torque, $T_{assist}$, is carried out by the electric motor, (see FIGS. 1 and 2).

The inventive subject matter utilizes the electric power steering system as an actuator to actively cancel steering nibble and brake judder by creating a digitally realized tuned resonator at the vehicle speed dependent nibble and/or brake judder frequencies. The output of the tuned resonator is fed back to the controller (see FIG. 1 or 2) as an additional assist force to the EPS rack to cancel the vibrations before they reach the steering wheel.

It is known that steering nibble is a vibration that occurs at 1× the rotational velocities of the front road wheels and brake judder occurs at 1× or 2× the rotational velocities. The vibration is most prevalent when these frequencies align with the steering/suspension resonant frequency, typically 10 to 15 Hz. The inventive subject matter provides a very narrow rejection of frequencies using a software generated tuned resonator that dynamically adapts the frequency of the tuned resonator with front wheel speeds. If front wheel speeds are unavailable, the inventive subject matter utilizes the vehicle speed. The precise tuning of the resonator provides the benefit of targeting the specific frequency to be rejected without generating a disturbance to other frequencies.

Figure 4:
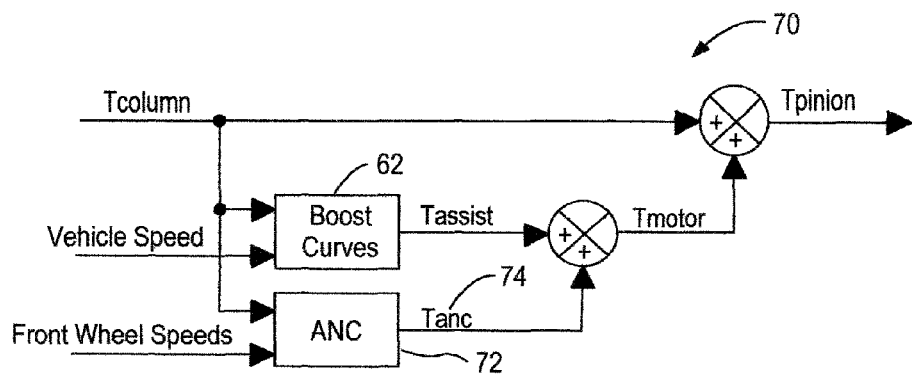
FIG. 4 is a block diagram of an embodiment of an electric power steering system of the inventive subject matter.

Referring to FIG. 4, a block diagram of an embodiment of an electric power steering system 70 of the inventive subject matter is shown. An active nibble control (ANC) algorithm 72 detects and identifies the magnitude of steering nibble and adds a nibble cancelling torque 74 ($T_{anc}$), at the electric motor of the steering system. The ANC algorithm calculates front wheel frequencies, calculates tuned resonator coefficients and steering nibble signal, and calculates the steering nibble cancelling torque.

Figure 5:
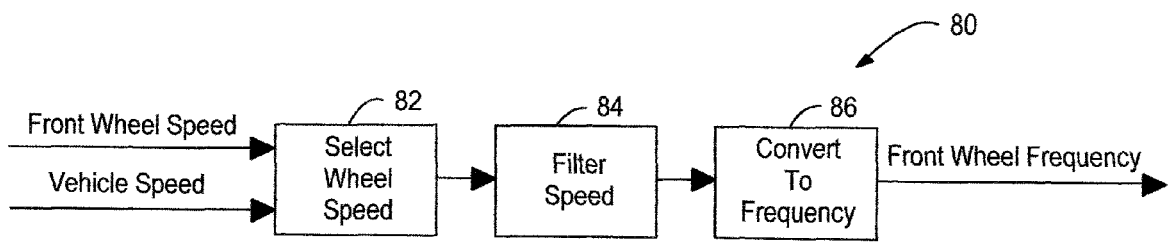
FIG. 5 is a block diagram of Front Wheel Frequency calculation.

To calculate the front wheel frequencies the ANC algorithm uses one or both front wheel speed signals available from the vehicles central vehicle communication controller. FIG. 5 is a block diagram of the calculation 80 of front wheel frequencies. One of the front wheel speed signals, such as the one having the most noise associated with steering nibble frequency, is selected 82. In the alternative, the average of both front wheel speeds is used. In the absence of wheel speed signals, the vehicle speed signal may be used. The speed signals are filtered 84 to reject high frequency noise and are compensated for any lags associated with filtering. The resultant filtered speed is used to calculate 86 front wheel frequencies, $W_n$, by using a vehicle tire conversion factor from wheel speed to frequency.

The ANC algorithm implements a software generated tuned resonator filter applied to the column torque signal, $T_{column}$ to produce a steering nibble signal SN(z).

$$SN(z) = \frac{N_0 \cdot z^2 + N_1 \cdot z + N_2}{D_0 \cdot z^2 + D_1 \cdot z + D_2} \cdot T(z)_{column} \qquad (1)$$

Where;
$N_0=(1-R)$; $N_1=0$; $N_2=(R-1)$; $D_0=1$; $D_1=-2 \cdot R \cdot \cos\theta$; $D_2=R^2$
R=Discrete decay factor;
$T_s$=Discrete sampling time in seconds;
$\omega_n$=Natural frequency in rad/sec.;
$\theta$=Discrete time resonance frequency (Rad)=$\omega_n \cdot T_s$.

The tuned resonator filter coefficients $N_1$ and $D_0$ are fixed. Coefficients $N_0$, $N_2$, and $D_0$ are a function of the discrete decay factor, R. The discrete decay factor, R, is increased very close to, without reaching, 1 to ensure maximum frequency rejection. The discrete decay factor, R, is lowered below 1 to speed up transient build up as $W_n$ varies. A good compromise for the discrete decay factor, or damping factor, R, is 0.985. In the event a compromise cannot be reached with satisfactory results, R adapts with vehicle acceleration. R can be set close to 1 when the vehicle is being driven at near constant speeds, and lowered when the vehicle's speed is changing. The filter coefficient, $D_1$, is the only term that needs to be dynamically adapted for varying front wheel frequency, $W_n$. This ensures the selection of the only possible nibble frequency signal for a given front wheel frequency, $W_n$, with strong rejection of neighboring frequencies.

The calculated steering nibble signal identifies the instantaneous steering nibble torque magnitude, frequency, and phase experienced by a driver at the steering wheel. This signal has a 0° phase lag and gain of 1 at the front wheel frequency, $W_n$, and is rapidly attenuated for frequencies away from $W_n$.

Figure 6:
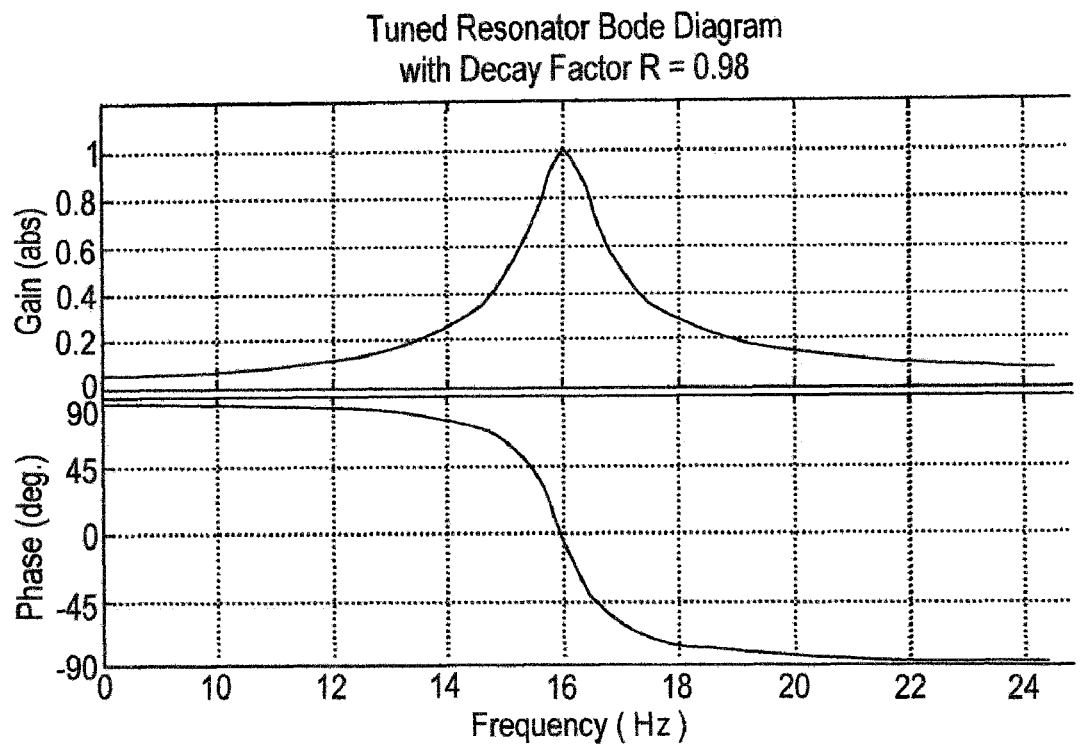
FIG. 6 is a Bode plot diagram for the tuned resonator representing gain and phase as a function of front wheel frequencies and having a discrete damping factor, R=0.98 and a resonant frequency of 16 Hz.
Figure 7:
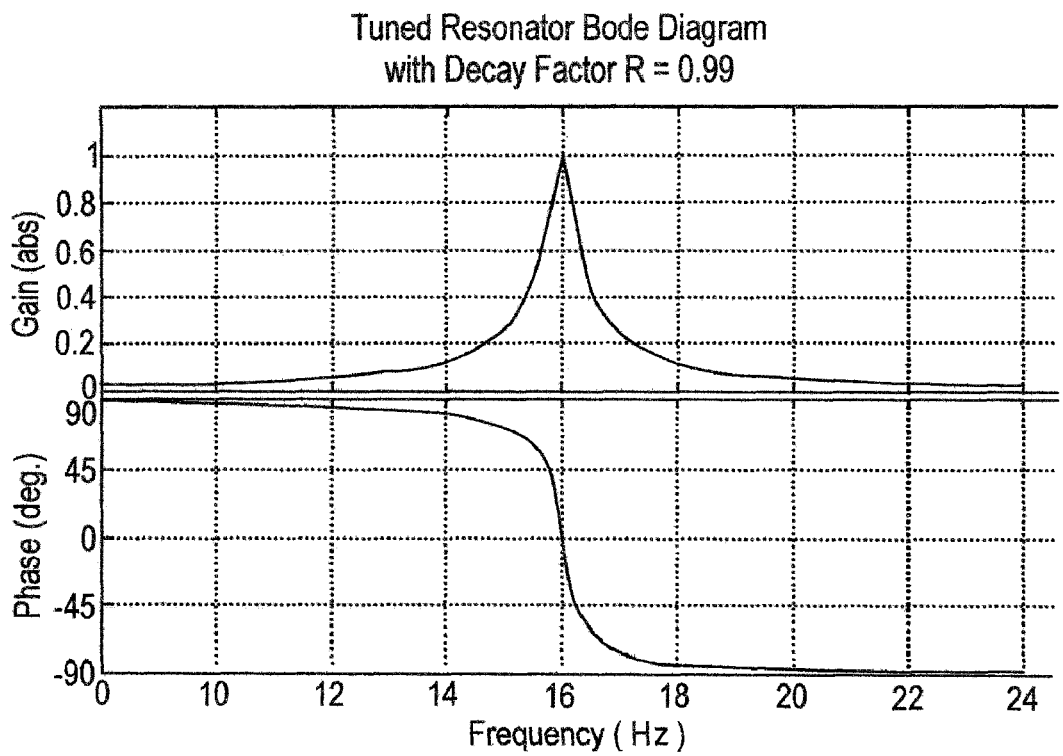
FIG. 7 is a Bode plot diagram for the tuned resonator representing gain and phase as a function of front wheel frequencies and having a discrete damping factor, R=0.99 and a resonant frequency of 16 Hz.

FIG. 6 and FIG. 7 are Bode plot diagrams for the tuned resonator of the inventive subject matter and represent gain and phase as a function of front wheel frequencies with a nibble frequency of 16 Hz. The discrete damping factor R=0.98 is shown in FIG. 6 and the discrete damping factor R=0.99 is shown in FIG. 7.

Figure 8:
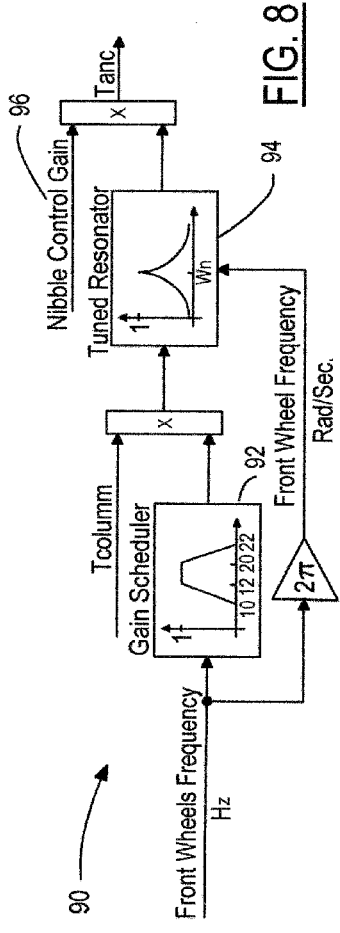
FIG. 8 is a block diagram of the calculation of steering nibble cancelling torque of the inventive subject matter.

The ANC algorithm calculates 90 a steering nibble cancelling torque, $T_{anc}$, as shown in the block diagram in FIG. 8. The steering column torque, $T_{column}$, is scaled by a gain scheduler 92 to select only frequencies within a predetermined steering nibble frequency range. This range is typically between 12 and 20 Hz. A tuned resonator filter 94 is applied to the modified column torque to construct a steering nibble signal, using Equation (1). The resultant signal is a sine wave whose amplitude, frequency, and phase completely match what the driver is experiencing as nibble at the steering wheel. The nibble signal is multiplied by a nibble control gain 96 to produce a steering nibble cancelling torque, $T_{anc}$. The nibble cancelling torque, $T_{anc}$, is added to the assist torque, $T_{assist}$, and is then carried out by the electric motor in the steering system.

In another embodiment, the tuned resonator filter is independently applied to each front wheel frequency. Both filters are applied to the steering column torque signal, $T_{column}$, and generates two steering nibble signals. The two results are combined, and used to calculate the nibble cancelling torque, $T_{anc}$. Separate filters will cancel separate wheel imbalances, i.e., imbalance on right and left wheels, the imbalances will be cancelled together. Another advantage to independent filters is that because they are independent, the inventive subject matter can compensate for wheel speed differences.

It should be noted that steering nibble is typically a first order phenomonen. However, second order may be present with or without braking. First order nibble happens at 1× the frequency of wheel speed. Second order nibble happens at 2× the frequency, and can be present with or without braking. The inventive subject matter has independent gain schedulers that address the first and second order phenomenon. According to the inventive subject matter, a threshold defines the selection of the order. For example, over the predetermined threshold, the first order is selected and below the threshold, the second order is selected. In this way, the gain for each order can be independently addressed.

Brake judder is another source of steering wheel vibrations during vehicle braking and is a first order and a second order phenomenon. Judder is caused by thickness variations or front brake disc warping. Judder vibration occurs at a frequency of once or twice the rotational velocities of the front road wheels. The tuned resonator filter of the inventive subject matter is implemented to cancel brake judder by dynamically adapting to a factor of the frequency of the front wheel's frequency. The judder signal, a second order nibble, occurs at once the frequency of the wheel speed, or twice the frequency of the wheel speed, which happens at half the speed of the first order nibble, described above. In this embodiment a second tuned resonator is also applied, however, the second filter is applied to the second order. Therefore, one tuned resonator filter is applied to the first order nibble and another tuned resonator filter is applied to the second order nibble, also called brake judder.

Figure 9:
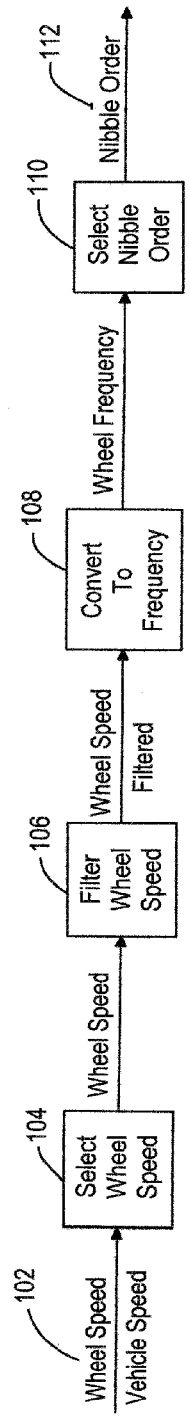
FIG. 9 is a block diagram representing the determination of nibble order according to the inventive subject matter.
Figure 10:
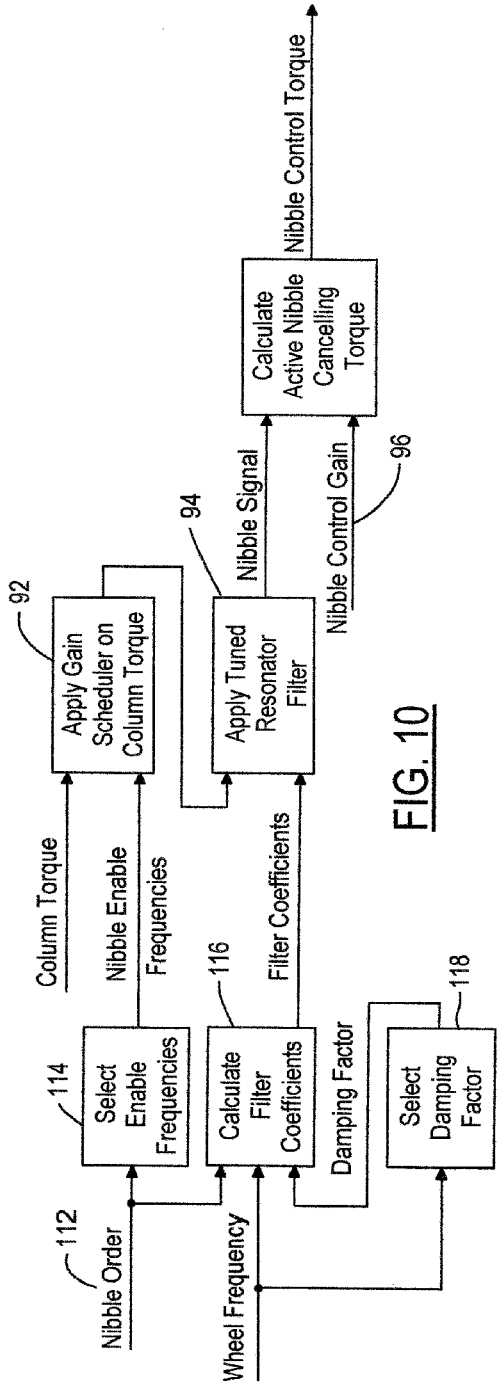
FIG. 10 is a block diagram of the inventive subject matter applied to a particular nibble order.

To address both first and second order nibble, an active nibble control algorithm of the inventive subject matter is presented in FIGS. 9 and 10. FIG. 9 is a block diagram representing the determination of nibble order 100. A vehicle speed signal and wheel speed signals 102 are provided to the controller. A wheel speed 104 is selected. The selected wheel speed is filtered 106 and converted to a frequency 108. The nibble order is selected 110 and provided as a nibble order signal 112.

FIG. 10 is a block diagram of the inventive subject matter applied to a particular nibble order; first order, second order, or first and second order. The nibble order 112 is used to select enable frequencies 114 of first or second order phenomenon. A damping factor is selected 118 based on vehicle speed. For a constant vehicle speed, the damping factor, R, is close to one. For variable speed, the damping factor is less than one. The nibble order 112 is also used, along with wheel frequency and selected damping factor, to calculate filter coefficients 116. The nibble enable frequencies and steering column torque signal, $T_{column}$, are subject to the gain scheduler 92. The output of the gain scheduler 92 and the filter coefficients 116 are subject to application of the tuned resonator filter 94 and produce a nibble signal. The nibble signal is multiplied by a nibble control gain 96 to calculate the active nibble cancelling torque, $T_{anc}$.

In the foregoing specification, the invention has been described with reference to specific exemplary embodiments. Various modifications and changes may be made, however, without departing from the scope of the present invention as set forth in the claims. The specification and figures are illustrative, rather than restrictive, and modifications are intended to be included within the scope of the present invention. Accordingly, the scope of the invention should be determined by the claims and their legal equivalents rather than by merely the examples described.

For example, the steps recited in any method or process claims may be executed in any order and are not limited to the specific order presented in the claims. Additionally, the components and/or elements recited in any apparatus claims may be assembled or otherwise operationally configured in a variety of permutations and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

The terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

The invention claimed is:

1. A method for actively cancelling steering nibble in an electric power steering system comprising the steps of:
    detecting steering wheel nibble independently for each front wheel frequency;
    generating two steering nibble signals, one for each front wheel frequency;
    calculating an active nibble cancelling torque based on a combination of both steering nibble signals;
    using an electric motor in the electric power steering system as an actuator to apply the active nibble cancelling torque thereby eliminating nibble.

2. The method as claimed in claim 1 wherein the step of detecting steering wheel nibble further comprises:
    creating a tuned resonator filter that is speed dependent wherein the speed is a vehicle speed, a front wheel speed, or both;
    determining a nibble order for the detected steering wheel nibble, the nibble order being a speed dependent nibble frequency; and
    selecting a damping factor for the detected steering wheel nibble.

3. The method as claimed in claim 2 wherein the nibble order is a first order nibble frequency or a second order nibble frequency.

4. The method as claimed in claim 2 wherein the nibble order is a first order and a second order nibble frequency.

5. The method as claimed in claim 2 wherein the step of calculating an active nibble cancelling torque further comprises multiplying the detected steering wheel nibble by a nibble control gain.

6. A system for actively cancelling steering wheel vibrations in an electric power steering system comprising:
    a steering wheel in the electric power steering system;
    an electric motor for assisting steering of the steering wheel;

a controller for controlling the electric motor and receiving a steering torque signal from the electric power steering system and providing an assist torque signal to the electric power steering system;

a tuned resonator filter realized in the controller, the tuned resonator filter is speed dependent and uses a damping factor, a nibble order and a wheel frequency to detect steering wheel vibration and calculate a steering wheel vibration torque cancelling signal based on a combination of a steering nibble torque signal identified for a first front wheel frequency and a steering nibble torque signal identified for a second front wheel frequency; and adding the steering wheel vibration torque cancelling signal to the assist torque signal provided to the electric power steering system thereby eliminating steering wheel vibration.

7. The system as claimed in claim 6 wherein the steering wheel vibration is either a first order frequency that is one multiple of a road wheel frequency or a second order frequency that is two times the road wheel frequency.

8. The system as claimed in claim 6 wherein the steering wheel vibration has components that are a first order frequency that is one multiple of a road wheel frequency and a second order frequency that is two times the road wheel frequency.

9. A method for actively cancelling steering nibble in an electric power steering system using a controller and an electric motor, the method comprising the steps of:

converting a selected wheel speed to a frequency;

selecting a nibble order;

determining nibble enable frequencies for cancellation for each of a first front wheel frequency and a second front wheel frequency;

selecting a damping factor based on changes in vehicle velocity;

calculating filter coefficients based on the selected damping factor, the selected nibble order and the wheel frequency;

applying a gain scheduler to a steering column torque signal for the nibble enable frequencies;

applying a digital filter to an output of the gain scheduler and using the filter coefficients to produce first and second nibble signals, one for each front wheel frequency;

calculating an active nibble cancelling torque signal from the combination of the first and second nibble signals; and applying the active nibble cancelling torque signal to the electric motor to cancel steering wheel nibble vibration.

10. The method as claimed in claim 9 wherein the step of selecting a nibble order further comprises selecting a first order nibble frequency.

11. The method as claimed in claim 9 wherein the step of selecting a nibble order further comprises selecting a second order nibble frequency.

12. The method as claimed in claim 9 wherein the step of selecting a nibble order further comprises:

selecting a first order nibble frequency; and selecting a second order nibble frequency.

13. The method as claimed in claim 9 wherein the step of applying a digital filter further comprises the step of dynamically adapting the digital filter as a tuned resonator filter to the front wheel frequencies.

14. The method as claimed in claim 9 wherein the step of calculating an active nibble cancelling torque signal further comprises applying a 180° out-of-phase cancelling torque in the electric motor of the electric power steering system.

\* \* \* \* \*